Dec. 22, 1942.  H. KOENIG  2,306,063
CLUTCH
Original Filed May 1, 1939

Inventor
HERBERT KOENIG

By
E. V. Hardway,
Attorney

Patented Dec. 22, 1942

2,306,063

UNITED STATES PATENT OFFICE 2,306,063

CLUTCH

Herbert Koenig, Houston, Tex.

Original application May 1, 1939, Serial No. 271,095. Divided and this application July 23, 1940, Serial No. 346,891

2 Claims. (Cl. 192—67)

This invention relates to a clutch.

An object of the invention is to provide an improved type of clutch for connecting a driving member to, and disconnecting it from, a driven member. The type of clutch herein described has been provided particularly for the purpose of connecting driving and driven members and effectively rotating the latter from the former when said members are aligned or misaligned.

It is another object of the invention to provide a clutch of the character described having resilient interconnecting parts for cushioning the shock upon engagement of the clutch.

The subject matter of the present invention has been divided out from my co-pending application, No. 271,095 for a Motor vehicle winch, filed May 1, 1939.

With the above and other objects in view the invention has particular relation to certain novel features of construction, operation and arrangement of parts, an example of which is given in this specification and illustrated in the accompanying drawing, wherein.

Figure 1:
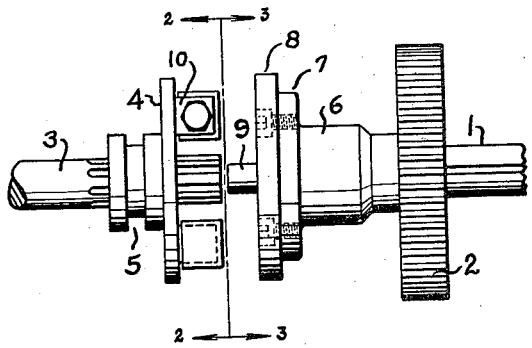
Figure 1 shows an elevational view of the clutch.
Figure 2:
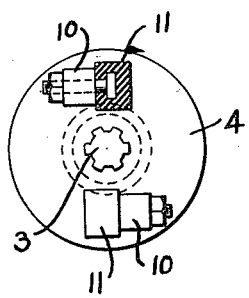
Figure 2 shows an elevational view of one of the clutch members.
Figure 3:
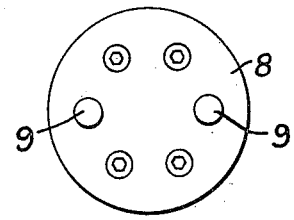
Figure 3 shows an elevational view of the other clutch member shown partly in section.

Referring now more particularly to the drawing, wherein like numerals of reference designate the same parts in each of the figures, the numeral 1 designates a driven member, in the present instance illustrated as a driven shaft. A suitable power takeoff may be mounted on, or connected to, this shaft and in the present illustration is shown as a spur gear 2. The numeral 3 designates a driving member such as a shaft. On one end there is splined the clutch disc 4 whose hub is provided with an annular groove 5 to receive a conventional actuating yoke for shifting said disc. It is obvious that the clutch disc 4 may be shifted longitudinally of the shaft 3 and still maintained in driving connection therewith.

Fastened on the adjacent end of the shaft 1 there is a thimble 6 on the forward end of which there is an annular flange 7 to which the clutch disc 8 is secured. This disc 8 has the oppositely arranged projecting driving pins 9, 9. The opposing face of the disc 4 has the outwardly extended anchors 10, 10 bolted to the forward sides of which are the resilient driving blocks 11, 11 preferably formed of rubber.

Upon shifting of the disc 4 in one direction the resilient blocks 11 will be shifted into the path of the pins 9, 9 and the rotation of the disc 4 will be thereby transmitted to the driven shaft 1. Upon shifting the disc 4 in the opposite direction the clutch will be obviously disengaged.

This type of clutch is specially designed as above described so that there will be a certain range of permissible movement of one of the shafts relative to the other and the driving connection between the clutch discs will be maintained even though the shafts are misaligned thus imparting flexibility to the clutch.

The resilient clutch members also greatly reduce the vibration by absorbing a portion of the shock incident to the engagement of the clutch while the driving shaft is in motion.

With the type of clutch hereinabove described the clutch may be readily engaged while the driving member is rotating and may be readily disengaged at any time. Furthermore the clutch forms a positive driving connection between the driving and driven members.

The drawing and description are illustrative merely, while the broad principle of the invention will be defined by the appended claims.

What I claim is:

1. A clutch for connecting and disconnecting a driving member and a driven member and comprising clutch parts one fixed on one of said members and the other being axially movable on, but rotatable with, the other of said members, projections carried by said clutch parts, some of said projections comprising anchors and cushioning members formed of yieldable material and secured to corresponding sides of the anchors, the projections of the respective clutch parts being arranged to be engaged or disengaged by the relative axial movement of said parts, said projections being of sufficient relative radial dimensions as to allow misalignment of said members while said projections are in engagement.

2. A clutch for connecting and disconnecting a driving and a driven member and comprising clutch discs, one fixed on one of said members and the other being axially movable on, but rotatable with, the other of said members, anchors on one of said discs, resilient cushioning members detachably secured to the corresponding sides of said anchors, projecting pins on the other of said discs positioned to be engaged with and disengaged from said yieldable cushioning members by the axial movement of said axially movable disc, said cushioning members being of sufficient radial dimensions to allow misalignment of said driving and driven members while said pins are in engagement with said cushioning members.

HERBERT KOENIG.